UNITED STATES PATENT OFFICE.

FABIO FERRARI, OF ROME, ITALY, ASSIGNOR TO THE COMPANY BOMBRINI PARODI-DELFINO, OF ROME, ITALY.

MANUFACTURE OF SLOW-SETTING CEMENT.

1,372,015.     Specification of Letters Patent.     Patented Mar. 22, 1921.

No Drawing.     Application filed August 23, 1920. Serial No. 405,416.

*To all whom it may concern:*

Be it known that I, FABIO FERRARI, a subject of the King of Italy, and residing at Rome, Italy, (whose post-address is Piazza S. S. Apostoli No. 18,) have invented certain new and useful Improvements in the Manufacture of Slow-Setting Cement, of which the following is a specification.

This invention relates to a slow setting calcareous cement free from the binary calcium compounds of alumina or iron generally used, which is prepared by converting an ordinary mixture producing Portland cement into slag.

Investigation of conditions of equilibrium in the system $$CaO-Al_2O_3-Fe_2O_3-SiO_2$$

carried out by the applicant, among other things with reference to the constitution of Portland cement, has proved that for the common centesimal compositions of the said body, that is, the composition corresponding to the values of the modulus $$\frac{CaO}{SiO_2+Al_2O_3+Fe_2O_3}$$

included between 1.8 and 2.2, when $Fe_2O_3$ and $Al_2O_3$ are in the proportion of their equivalents (159.8÷102.2), the said sesquioxids, instead of producing (as they do for the ordinary proportion generally reverse of that mentioned above) considerable quantities of aluminates and ferrite of calcium, are completely converted into ternary silicates (of the form $2CaO.Al_2O_3.SiO_2$; $2CaO.Fe_2O_3.2SiO_2$) which are not decomposed by water and by saline solutions (such as chlorids, sulfates, etc.).

Disappearance of the above mentioned binary compounds is practically produced when $Fe_2O_3$ and $Al_2O_3$ are in the proportion of 1:1.

For each composition corresponding to the fixed values of $$\frac{CaO}{SiO_2+Al_2O_3+Fe_2O_3}$$

and of $$\frac{SiO_2}{Al_2O_3+Fe_2O_3}$$

starting from the ordinary portion between $Fe_2O_3$ and $Al_2O_3$ the fusibility of the mixture regularly sinks, owing to the tendency of the proportion, to the value $\frac{159.8}{102.2}$ and thus reaches its maximum value.

Finally, the formation of ternary silicates of the above described type makes it possible, by suppressing that of inactive binary silicates, to obtain the maximum production of the essential hydraulite.

The above mentioned facts make it possible to establish that an agglomerant, the composition of which corresponds to well determined values of $$\frac{CaO}{SiO_2+Al_2O_3+Fe_2O_3}$$

and of $$\frac{SiO_2}{Al_2O_3+Fe_2O_3}$$

equal to an ordinary Portland cement, but containing oxids $Fe_2O_3$ and $Al_2O_3$ in the proportion of their equivalents, must, as compared with the said cement: (1) require for its formation a smaller consumption of fuel; (2) contain a greater proportion of the essential hydraulity; (3) not decompose under the action of sea water or sulfated water generally.

The applicant prepares the product in question by using ordinary materials (limestone and clay) used in the manufacture of Portland cement. By suitable additions of silicious sand and of iron oxid, he raises his raw mixtures to the values corresponding to the well fixed values of $$\frac{CaO}{SiO_2+Al_2O_3+Fe_2O_3}$$

and of $$\frac{SiO_2}{Al_2O_3+Fe_2O_3}$$

starting from the ordinary proportion between $Fe_2O_3$ and $Al_2O_3$ comprised between 1 and 1.563.

If the burning is carried out in accordance with the ordinary methods (fixed or rotary kiln) a slow setting product is obtained which replaces advantageously and economically Portland cement.

Having now particularly described and ascertained the nature of the said invention and in what manner the same is to be performed, I declare that what I claim is:—

A slow setting calcareous cement free from binary calcium compounds of alumina or iron generally used, which is prepared by converting into slag a raw mixture of the ordinary type used for Portland cement, in which the proportion between the oxids $Fe_2O_3$ and $Al_2O_3$ is comprised between 1.10 and 1.563.

In testimony whereof I have hereunto signed my name in the presence of two witnesses.

FABIO FERRARI.

Witnesses:
   GUIO CIMPANELLI,
   DUILIO NARDENI.